United States Patent [19]

Yonemitsu et al.

[11] 4,177,247

[45] Dec. 4, 1979

[54] PROCESS FOR PRODUCING DITHIONITES

[75] Inventors: Eiichi Yonemitsu; Hiroshi Miyamori, both of Kashiwa; Takanari Nawata, Tokyo; Tomio Fujioka, Matsudo; Akira Ito; Makoto Kobayashi, both of Tokyo, all of Japan

[73] Assignee: Mitsubishi Gas Chemical Company, Inc., Tokyo, Japan

[21] Appl. No.: 903,496

[22] Filed: May 8, 1978

[30] Foreign Application Priority Data

May 17, 1977 [JP] Japan ............................ 52-56934

[51] Int. Cl.² ............................................. C01B 17/66
[52] U.S. Cl. ................................................... 423/515
[58] Field of Search ......................................... 423/515

[56] References Cited

U.S. PATENT DOCUMENTS

| 1,166,160 | 12/1915 | Von Portheim | 423/515 |
| 2,083,870 | 6/1937 | Scott et al. | 423/515 |
| 3,226,185 | 12/1965 | Gyan et al. | 423/515 |
| 3,826,818 | 7/1974 | Heitman | 423/515 |

*Primary Examiner*—Jack Cooper
*Attorney, Agent, or Firm*—Brooks, Haidt, Haffner & Delahunty

[57] ABSTRACT

Dithionites are produced by reacting hydroquinones with bisulfites, pyrosulfites, alkyl sulfites, or aryl sulfites, substances capable of forming these salts upon reacting with sulfur dioxide or sulfurous acid, and sulfur dioxide or sulfurous acid.

47 Claims, No Drawings

PROCESS FOR PRODUCING DITHIONITES

BACKGROUND OF THE INVENTION

1. Field of the Invention

The present invention relates to a novel process for producing dithionites, and more particularly, to a process for producing dithionites by using hydroquinones.

2. Description of the Prior Art

Dithionites have a powerful reducing action on many materials, and are useful industrial chemicals which may be used as an auxiliary agent for dyeing, bleaching agent or the like.

Dithionites have been produced by various known processes such as zinc process, amalgam process, sodium formate process and the like. The present invention provides a completely new process for producing dithionites.

SUMMARY OF THE INVENTION

An object of the present invention is to provide an entirely new process for producing dithionites.

Another object of the present invention is to provide a process for producing dithionites which involves only simple procedures and gives a good yield of dithionites.

A further object of the present invention is to provide a process for producing dithionites in which hydroquinones can be repeatedly used, that is, quinones produced in the process can be converted to hydroquinones and in this repeated use of hydroquinones, only hydrogen is actually consumed while the hydroquinones works, in a sense, as a hydrogen carrier.

Still another object of the present invention is to provide a process for producing sodium dithionite capable of using relatively inexpensive starting material such as sodium sulfite, a by-product in desulfurization of waste gas.

A still further object of the present invention is to provide a process for producing dithionites free from wastes which should be treated by complicated procedures.

Still another object of the present invention is to provide a process for producing dithionites free from pollutions such as those caused by mercury in conventional amalgam processes.

According to the present invention, there is provided a process for preparing a dithionite which comprises reacting (A) a member selected from the group consisting of
 (1) bisulfites, pyrosulfites, alkylsulfites, and arylsulfites of elements of Groups Ia, IIa and IIb of the Periodic Table, and ammonium and
 (2) (i) substances capable of producing the salts as mentioned in (1) above by reacting with sulfur dioxide or sulfurous acid, and (ii) sulfur dioxide or sulfurous acid, with (B) a hydroquinone.

DESCRIPTION OF THE PREFERRED EMBODIMENTS

Representative elements of Group Ia used in the present invention are lithium, sodium, potassium and the like. Representative elements of Group IIa are magnesium, calcium and the like. Representative elements of Group IIb are zinc and the like.

Salts of elements of Groups Ia, IIa and IIb and ammonium may be selected optionally depending upon the desired kind of dithionite. Salts of elements of Group Ia or ammonium are preferable in view of the yield.

Pyrosulfites can be produced by dehydration of bisulfites.

The alkyl group in the alkyl sulfite usually contains 1–5 carbon atoms. The aryl group in the aryl sulfite may be phenyl or tolyl. As salts of (A) (1), bisulfites and pyrosulfites are preferable starting materials from the viewpoint of yield.

Examples of bisulfites, pyrosulfites, alkyl sulfites and aryl sulfites are sodium bisulfite, potassium bisulfite, calcium bisulfite, zinc bisulfite, sodium pyrosulfite, ethyl sodium sulfite, butyl sodium sulfite, phenyl sodium sulfite and the like, but are not limited thereto. Among them, sodium bisulfite and sodium pyrosulfite are preferable.

Amounts of bisulfite, pyrosulfite, alkyl sulfite and aryl sulfite are not critical, but may be optionally selected, for example, taking the yield of dithionites into consideration.

The amount of bisulfites, alkyl sulfites or aryl sulfites is usually not more than 10 moles, preferably not more than 4 moles, more preferably 0.1–4 moles per one mole of the hydroquinone. Further the amount of pyrosulfites is a half of that of bisulfites.

Bisulfites, pyrosulfites, alkyl sulfites and aryl sulfites are usually used in a form of a solution or suspension in an inert solvent or water. When water is used, it is preferable that amount of water does not exceed a certain limit as mentioned later.

As (A) (2) (i) a substance capable of producing bisulfites, pyrosulfites, alkyl sulfites or aryl sulfites by reacting with sulfur dioxide or sulfurous acid, any substance may be used as far as said substance can be reacted with sulfur dioxide or sulfurous acid to produce bisulfites, pyrosulfites, alkyl sulfites or aryl sulfites. For example, compounds of an element of Group Ia of the Periodic Table, compounds of an element of Group IIa, compounds of an element of Group IIb, ammonia, or ammonium compounds can be used. These compounds may be optionally selected depending upon the desired dithionite. Compounds of an element of Group Ia or ammonium are preferable from the view point of yield.

Representative elements of Group Ia are lithium, sodium, potassium and the like. Representative elements of Group IIa are magnesium, calcium and the like. Representative elements of Group IIb are zinc and the like.

As compounds of elements of Group Ia, Group IIa or Group IIb of the Periodic Table, there may be mentioned hydroxides, oxides, sulfides, sulfites, amides, carbonates, bicarbonates, phosphates, hydrogenphosphates, borates, hydrogenborates, alcoholates, salts of phenols such as phenolates, and salts of organic acids such as acetates, propionates and the like. Among them, hydroxides, oxides, carbonates, and sulfites are preferable from an economical viewpoint. More particularly, the compounds of elements of Groups Ia, IIa and IIb may be sodium hydroxide, potassium hydroxide, lithium hydroxide, calcium hydroxide, magnesium oxide, zinc oxide, sodium sulfide, sodium sulfite, calcium sulfite, zinc sulfite, sodium amide, sodium carbonate, calcium carbonate, sodium phosphate, sodium borate, sodium methylate, sodium butylate, magnesium methylate, zinc methylate, sodium phenolate, sodium acetate and the like.

Examples of the ammonium compounds are ammonium hydroxide, sulfide, sulfite, carbonate, bicarbonate, phosphate, hydrogenphosphate, borate, hydrogenborate, and ammonium salts of organic acids such as ammonium acetate, ammonium propionate and the like. Among them, ammonium hydroxide, carbonate and sulfite are preferable.

Among the above mentioned salts of (A) (2) (i), sodium sulfite, sodium hydroxide and sodium carbonate and the like and more preferable.

Amounts of compounds of elements of Group Ia, compounds of elements of Group IIa, compounds of elements of Group IIb, ammonia or ammonium compounds are not critical, but may be optionally determined taking the yield and the like into consideration. The amount of the compound of element of Group Ia, ammonia or ammonium compound is usually 0.1–10 moles, preferably 0.5–2 moles per one mole of sulfur dioxide or sulfurous acid. The amount of the compound of element of Group IIa or compound of element of Group IIb is usually less than that of the compound of element of Group Ia and other compounds, and 0.05–5 moles, preferably 0.25–1 mole per one mole of sulfur dioxide or sulfurous acid.

The compounds of elements of Group Ia, Group IIa and Group IIb, ammonia and ammonium compounds are usually used in a form of a solution of dispersion in an inert solvent. Ammonia may be used in a form of gas.

Amounts of sulfur dioxide or sulfurous acid are not critical, but may be optionally determined taking the yield of the dithionite. The amount of sulfur dioxide is usually not more than 10 moles, preferably not more than 5 moles, more preferably 0.1–5 moles per one mole of the hydroquinone. Sulfur dioxide may be used in a gaseous form or by dissolving in an inert solvent. When sulfur dioxide is used in a system containing water, it becomes sulfurous acid.

The hydroquinones used in the present invention are aromatic compounds having at least one aromatic nucleus and at least two hydroxy groups and converting to the corresponding quinones when oxidized to lose the hydrogen atoms.

Examples of the hydroquinone are mononuclear types such as benzohydroquinone and the like; polynuclear types such as naphthohydroquinone, anthrahydroquinone, phenanthrahydroquinone and the like; and derivatives thereof. As the derivatives, there may be mentioned the hydroquinones having one or more of the following substituents: —R, —X, —OH, —OR, —SH, —$NH_2$, —NHR, —$NR_2$, —COOH, —$SO_3H$, —COOR, —$CONH_2$, —CHO and the like, where R is alkyl and X is halo, preferably electron donative groups such as —R, —X, —OH, —OR, —SH, —$NH_2$, —NHR, —$NR_2$ and the like, particularly preferred with —R where R and X are as defined above.

Among the hydroquinones, anthrahydroquinones, particularly 9,10-anthrahydroquinones, and their derivatives are preferable. Among the derivatives, alkyl-substituted ones, in particular, $C_{1-5}$ alkyl-substituted ones are preferable.

More particularly, examples of the hydroquinones used in the present invention are: hydroquinones such as 1,4-benzohydroquinone and the like; derivatives thereof such as alkyl substituted derivatives, for example, durohydroquinone; naphthohydroquinones such as 1,4-naphthohydroquinone; derivatives thereof such as alkyl-substituted ones, for example, tetrahydroanthrahydroquinone; anthrahydroquinones such as 9,10-anthrahydroquinone and the like; derivatives of anthrahydroquinone, for example, alkyl-substituted ones such as ethylanthrahydroquinone, amylanthrahydroquinone (t-amyl substituted ones, sec-amyl substituted ones or a mixture thereof), butyl-anthrahydroquinone, dibutyl-anthrahydroquinone, methyl-amyl-anthrahydroquinone, ethyl-amyl-anthrahydroquinone, diamyl-anthrahydroquinone, butyl-amyl-anthrahydroquinone, methyl-butyl-anthrahydroquinone, ethyl-butyl-anthrahydroquinone, dimethyl-butyl-anthrahydroquinone and the like, hydroxy-substituted ones such as hydroxyanthrahydroquinone and the like, halo-substituted ones such as chloroanthrahydroquinone and the like, amino-substituted ones such as aminoanthrahydroquinone and the like, alkoxy-substituted ones such as ethoxyanthrahydroquinone and the like, and alkoxycarbonyl-substituted ones such as amyloxycarbonylanthrahydroquinone and the like; and phenanthrahydroquinones such as 9,10-phenanthrahydroquinone and the like and derivatives thereof.

Among them, alkyl-substituted 9,10-anthrahydroquinones are preferable.

The hydroquinones may be used even when they contain the corresponding quinones.

The hydroquinones are usually used in a form of a solution in an appropriate inert solvent. Concentration of hydroquinones is not critical. It is desirable to select a solvent and its amount taking into consideration solubility of the materials other than the hydroquinone as well as the hydroquinone.

What is meant by "inert solvent" is a solvent which does not disturb the reactions and can dissolve a hydroquinone or both a hydroquinone and an oxidized product thereof, i.e. the corresponding quinone, and is used for facilitating the reactions smoothly.

Examples of such solvent are: aromatic hydrocarbons such as benzene, toluene, xylene, mesitylene and the like; ethers such as ethyl ether, tetrahydrofuran, dioxane and the like; organic acid esters such as ethyl acetate and the like; alcohols such as methanol, ethanol, butanol, diisobutyl carbinol and the like; amides such as dimethyl formamide; and inorganic acid esters such as phosphoric acid esters and the like.

These solvents may be used alone or in combination.

Among these solvents, alcohols, phosphoric acid esters, mixtures of an alcohol and other solvent(s) or mixtures of a phosphoric acid ester and other solvent(s) are preferable. In particular, mixtures of an alcohol and an aromatic hydrocarbon are preferable. As the alcohol, diisobutyl carbinol, butanol and the like are preferable and as the aromatic hydrocarbon, mesitylene, xylene and the like are preferable.

The solvents may be used even when they contain water or are mixed with water, but it is preferable that the water content be low, and it is further preferable that the water content in all the solvents in the whole reaction system is not more than 20% by volume.

Upon carrying out the reactions involved in the process of the present invention, it is preferable to prevent the hydroquinones and the resulting dithionites from contacting with air or oxygen and thereby causing side reactions and decomposing. For this purpose, the reactions may be carried out in the absence of such gas or in an atmosphere of an inert gas such as nitrogen, hydrogen, carbon dioxide and the like.

According to the present invention, the order of feeding the starting materials and that of carrying out the reactions are not limited, but there are various ways. For example, a process comprising reacting a hydroquinone with a salt selected from bisulfites, prosulfites, alkylsulfites, and arylsulfites of elements of Groups Ia, IIa and IIb of the Periodic Table, and ammonium (hereinafter referred to as "a salt of (A) (1)");

a process comprising mixing a substance capable of producing a salt of (A) (1) by reacting with sulfur dioxide or sulfurous acid (hereinafter referred to as "a substance of (A) (2) (i)"), sulfur dioxide or sulfurous acid, and a hydroquinone and then effecting the reaction thereof;

a process comprising reacting a substance (A) (2) (i) with sulfur dioxide or sulfurous acid, and then reacting the resulting product with a hydroquinone;

a process comprising mixing a hydroquinone and sulfur dioxide or sulfurous acid, and then reacting the resulting mixture with a substance of (A) (2) (i); and a process comprising mixing and reacting a salt of (A) (2) (i) with a hydroquinone and then reacting the resulting product with sulfur dioxide or sulfurous acid.

The reactions may be carried out continuously or batchwise.

The reaction mechanism involved in the present invention is not clear. Though it is not desired to limit the invention to any particular theory, it is believed as shown below when, for example, sodium bisulfite, sodium hydroxide or sodium alkylsulfite is used to produce sodium dithionite. In the following formulas, $H_2Q$ and $Q$ represent a hydroquinone and quinone, respectively.

$2NaHSO_3 + H_2Q \rightarrow Na_2S_2O_4 + 2H_2O + Q$

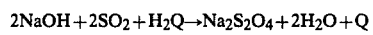
$2NaOH + 2SO_2 + H_2Q \rightarrow Na_2S_2O_4 + 2H_2O + Q$

$H_2Q + 2NaOH \longrightarrow Na_2Q + 2H_2O \xrightarrow{2SO_2}$

$[2NaHSO_3 + H_2Q] \longrightarrow Na_2S_2O_4 + 2H_2O + Q$

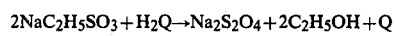
$2NaC_2H_5SO_3 + H_2Q \rightarrow Na_2S_2O_4 + 2C_2H_5OH + Q$

The reaction temperature may be optionally set taking into consideration the desirable reaction velocity and the decomposition temperature of the dithionite in question, and is usually from $-20°$ to $150°$ C., preferred with from $20°$ to $120°$ C.

The reaction time may be optionally determined taking into consideration the reaction temperature and other conditions, and is usually from about several seconds to several hours. The end point of the reaction can be easily known by measuring amount of the dithionite in the reaction mixture.

After completion of the reaction the resulting dithionite can be recovered in a form of solid, an aqueous solution, slurry or a formaldehyde addition product. When the product is recovered from the reaction mixture directly in a form of solid, it can be separated by filtration, centrifugation and the like, and if desired, the separated product is washed with a solvent and dried.

The following examples are given for the purpose of illustration and not by way of limitation. In the following "mm." stands for millimole(s).

EXAMPLE 1

In a four-necked glass reactor fitted with a stirrer, a cooler, and a thermometer 2.6 g. (25 mm.) of sodium bisulfite was dissolved and suspended in 25 ml. of methanol. To this mixture, in a nitrogen atmosphere, was added 80 ml. of a solution of 15 mm. of 2-t-amyl-9,10-anthrahydroquinone (hereinafter referred to as "t-AmAHQ") in a mixture solvent of mesitylene and diisobutylcarbinol (hereinafter referred to as "DIBC") (55:45 by volume) and the reaction was carried out under reflux of methanol for 80 minutes with stirring. After completion of the reaction, the reaction mixture was cooled to room temperature and the resulting white precipitate of sodium dithionite was filtered, washed with methanol, and dried. 7.4 mm. of sodium dithionite was obtained and the yield was 59% based on the charged sodium bisulfite.

When 2.4 g. (12.5 mm.) of sodium pyrosulfite was used in place of sodium bisulfite, sodium dithionite was produced in 72% yield.

EXAMPLE 2

In a reactor similar to that in Example 1 was placed an aqueous magnesium bisulfite containing 1.86 g. (10 mm.) of magnesium bisulfite, and 30 ml. of ethanol was added. Then in a nitrogen atmosphere 50 ml. of a solution of 10 mm. of 2-ethyl-9,10-anthrahydroquinone (hereinafter referred to as "Et-AHQ") in a mixture solvent of DIBC and mesitylene (3:2, by volume) was added thereto and the reaction was carried out at $82°$ C. for 10 minutes to produce magnesium dithionite in 4% yield based on magnesium bisulfite.

EXAMPLE 3

Repeating the procedures of Example 2 except that an aqueous zinc bisulfite containing 2.3 g. (10 mm.) of zinc bisulfite was used in place of the aqueous magnesium bisulfite, there was obtained zinc dithionite in 4% yield based on zinc bisulfite.

EXAMPLE 4

In a reactor similar to that in Example 1, 4.0 g. (40 mm.) of ammonium bisulfite was dissolved and suspended in 26 ml. of methanol, and in a nitrogen atmosphere 100 ml. of a solution of 20 mm. of Et-AHQ in a mixture solvent of DIBC and mesitylene (3:2, by volume) was added thereto and the reaction was conducted at $50°$ C. for 7 minutes to obtain ammonium dithionite in 34% yield based on ammonium bisulfite.

In the above procedure, when 3.6 g. (20 mm.) of ammonium pyrosulfite was used in place of ammonium bisulfite, ammonium dithionite was obtained in 39% yield.

EXAMPLE 5

In a reactor similar to that in Example 1, 3.0 g. (22.5 mm.) of ethyl sodium sulfite was dissolved in a mixture of 9 ml. of ethanol and 50 ml. of xylene and in a nitrogen atmosphere 30 ml. of a solution of 13.1 mm. of t-AmAHQ in a mixture solvent of xylene and ethyl alcohol (5:1, by volume) was added thereto and the reaction was carried out at $77°$ C. for 60 minutes to produce sodium dithionite in 81.0% yield based on ethyl sodium sulfite.

EXAMPLE 6

In a reactor similar to that in Example 1, 4.3 g. (20 mm.) of methyl magnesium sulfite was dissolved in 30 ml. of methanol and in a nitrogen atmosphere 20 mm. of t-AmAHQ dissolved in 30 ml. of xylene and 20 ml. of DIBC was added thereto and the reaction was carried out at $70°$ C. for 30 min. to produce magnesium dithionite in 45% yield based on methyl magnesium sulfite.

EXAMPLE 7

Repeating the procedures in Example 6 except that 5.1 g. (20 mm.) of methyl zinc sulfite was used in place of methyl magnesium sulfite, there was obtained zinc dithionite in 40% yield based on methyl zinc sulfite.

EXAMPLE 8

Repeating the procedure of Example 5 except that 4.05 g. (22.5 mm.) of phenyl sodium sulfite was used in place of ethyl sodium sulfite, there was obtained sodium dithionite in 65% yield based on phenyl sodium sulfite.

EXAMPLE 9

In a reactor similar to that in Example 1, 7.6 g. (0.19 moles) of sodium hydroxide and 140 ml. of methanol were placed and stirred and then 46.08 g a solution of sulfur dioxide (11.52 g., 0.18 moles) of methanol was added at room temperature, and in a nitrogen atomsphere 340 ml. of a solution of 0.094 moles of t-AmAHQ in a mixture solvent of mesitylene and DIBC (55:45, by volume) was added and the resulting mixture was reacted with stirring for 25 min. at a methanol refluxing temperature. After the reaction, the reaction mixture was cooled to room temperature to form a white precipitate of sodium dithionite and the precipitate was washed with 50 ml. of methanol and dried to give 14.3 g. of crude sodium dithionite crystal. Purity of the crystal was 62% and the yield was 56% based on sulfur dioxide.

EXAMPLE 10

Repeating the procedure of Example 9 except that the solution of sodium hydroxide, the solution of sulfur dioxide and the solution of t-AmAHQ were mixed and then the reaction was carried out at elevated temperature, there was obtained sodium dithionite in 61% yield based on sulfur dioxide.

EXAMPLE 11

Repeating the procedure of Example 9 except that the solution of sulfur dioxide and the solution of t-AmAHQ were mixed and reacted with the solution of sodium hydroxide, there was obtained sodium dithionite in 25% yield based on sulfur dioxide.

EXAMPLE 12

Repeating the procedure of Example 9 except that the solution of sodium hydroxide was reacted with the solution of t-AmAHQ to form the sodium salt and then the sodium salt was reacted with the solution of sulfur dioxide, there was produced sodium dithionite in 55% yield based on sulfur dioxide.

EXAMPLE 13

In a reactor similar to that in Example 1, 12.9 ml. of a solution of 0.932 g. (23.3 mm.) of sodium hydroxide in ethyl alcohol was placed and 47.8 ml. of a solution of 1.38 g. (21.6 mm.) of sulfur dioxide in xylene was added thereto at room temperature and the reaction was carried out. Then, in a nitrogen atmosphere 30 ml. of a solution of 13.1 mm. of t-AmAHQ in a mixture solvent of xylene and ethanol (5:1, by volume) was added thereto and the reaction was carried out at 78° C. for 30 min. with stirring to give sodium dithionite in 81.0% based on sulfur dioxide.

When the order of the reactions was changed, that is, sodium hydroxide and t-AmAHQ were reacted firstly at room temperature and then sulfur dioxide was added and reacted at an elevated temperature to give sodium dithionite in 78.2% yield.

EXAMPLE 14

In a reactor similar to that in Example 1, 8.9 ml. of a solution of 1.78 g. (26.2 mm.) of sodium ethoxide in ethyl alcohol was placed and 50.1 ml. of a solution of sulfur dioxide (1.44 g., 22.5 mm.) was added thereto at room temperature to cause a reaction, and then 30 ml. of a solution of 13.1 mm. of t-AmAHQ in a mixture solvent of xylene and ethyl alcohol (5:1, by volume) was added and a reaction was effected at 77° C. for 60 min. to produce sodium dithionite in 81.0% yield based on sulfur dioxide.

When sodium ethoxide and t-AmAHQ were firstly reacted and then sulfur dioxide was added and reacted at an elevated temperature, sodium dithionite was produced in 80.5% yield.

EXAMPLE 15

Repeating the procedure of Example 14 except that sodium phenolate 3.04 g. (26.2 mm.) was used in place of sodium ethoxide, sodium dithionite was produced in 64% yield based on sulfur dioxide.

EXAMPLE 16

In a reactor similar to that in Example 1, 12.6 ml. of a solution of 1.23 g. (11.6 mm.) of sodium carbonate in ethanol was placed and 47.8 ml. of a solution of 1.38 g. (21.6 mm.) of sulfur dioxide in xylene was added and reacted at room temperature for 3 hours with stirring and then at 78° C. for 2 hours. Then, in a nitrogen atomsphere, 30 ml. of a solution of 13.1 mm. of t-AmAHQ in a mixture solvent of xylene and ethanol (5:1, by volume) was added thereto and reacted at 78° C. for 10 min. with stirring to give sodium dithionite in 43% yield.

When sodium carbonate and t-AmAHQ were firstly mixed and then sulfur dioxide was added to cause the reaction at an elevated temperature, sodium dithionite was obtained in 39% yield.

EXAMPLE 17

In a reactor similar to that in Example 1 was placed 18 ml. of a solution of 2 g. (50 mm.) of sodium hydroxide in ethanol, and then 14 ml. of a solution of 3.2 g. (50 mm.) of sulfur dioxide in xylene was added thereto. In a nitrogen atmosphere, 130 ml. of a solution of 30 mm. of 1-hydroxy-9,10-anthrahydroquinone in a mixture solvent of xylene, ethanol and dioxane (41:16:43, by volume) was added thereto and reacted at 85° C. for 70 min. with stirring to produce sodium dithionite in 25% yield.

When sodium hydroxide and 1-hydroxy-anthrahydroquinone were reacted first and sulfur dioxide was added thereto and reacted at an elevated temperature, sodium dithionite was obtained in 23% yield.

EXAMPLE 18

In a reactor similar to that in Example 1 was placed 17.6 ml. of a solution of 2 g. (50 mm.) of sodium hydroxide in ethanol, and 14.3 ml. of a solution of 3.2 g. (50 mm.) of sulfur dioxide in xylene was added thereto and reacted with stirring. In a nitrogen atmosphere, 118 ml. of a solution of 29.5 mm. of 2-chloro-9,10-anthrahydroquinone in a mixture solvent of xylene and ethanol (5:1, by volume) was added and reacted at 80° C. for 2.5 hours with stirring to produce sodium dithionite in 1.1% yield.

When sodium hydroxide and 2-chloroanthrahydroquinone were first reacted and then sulfur dioxide was added and reacted at an elevated temperature, sodium dithinite was obtained in 1% yield.

EXAMPLE 19

In a reactor similar to that in Example 1 was placed 8.8 ml. of a solution of 1.0 g. (25 mm.) of sodium hydroxide in ethanol, and 7.2 ml. of a solution of sulfur dioxide (1.6 g., 25 mm.) in xylene was added thereto at room temperature and reacted. Then, in a nitrogen atomsphere, 43 ml. of a solution of 15.6 mm. of 5,6,7,8-tetrahydro-2-amyl-9,10-anthrahydroquinone in a mixture solvent of xylene and ethanol as in Example 18 was added thereto and reacted with stirring at 82° C. for 40 min. to produce sodium dithionite in 0.7% yield.

When sodium hydroxide and tetrahydroamylanthrahydroquinone were reacted first and then sulfur dioxide was added and reacted at an elevated temperature, sodium dithionite was obtained in 0.6% yield.

EXAMPLE 20

In a reactor similar to that in Example 1 was placed 15.3 ml. of a solution of sodium hydroxide (0.96 g., 24 mm.) in ethanol, and 7.1 ml. of a solution of sulfur dioxide (1.4 g., 22 mm.) in ethanol was added and reacted at room temperature. Then, in a nitrogen atomsphere 100 ml. of a solution of 1-amino-9,10-anthrahydroquinone (12 mm.) in DMF was added and reacted at 80° C. for 25 min. with stirring to produce sodium dithionite in 1.5% yield.

When sodium hydroxide and 1-aminoanthrahydroquinone were reacted firstly and sulfur dioxide was added and reacted at an elevated temperature to produce sodium dithionite in 1.4% yield.

EXAMPLE 21

In a reactor similar to that in Example 1 was placed 100 ml. of a solution of 0.99 g. (14.5 mm.) of sodium ethoxide in a mixture solvent of n-propanol and ethanol (2:1, by volume), and 4 ml. of a solution of sulfur dioxide (0.93 g., 14.5 mm.) in xylene was added and reacted at room temperature. Then, in a nitrogen atmosphere 39.8 ml. of a solution of 6.2 mm. of durohydroquinone (tetramethylhydroquinone) in a mixture solvent of xylene, propanol, ethanol, and tetrahydrofuran (4:2:1:5, by volume) was added and reacted at 82° C. for 130 min. to produce sodium dithionite in 0.6% yield.

When sodium ethoxide and durohydroquinone were reacted first and then sulfur dioxide was added and reacted at an elevated temperature, sodium dithionite was obtained in 0.5% yield.

EXAMPLE 22

In a reactor similar to that in Example 1 was placed 18 ml. of a solution of 2 g. (50 mm.) of sodium hydroxide in ethanol, and 14 ml. of a solution of sulfur dioxide (3.2 g., 50 mm.) in xylene was added and reacted at room temperature. Then in a nitrogen atmosphere 70 ml. of a solution of 28 mm. of 1,4-naphthohydroquinone in a mixture solvent of xylene and ethanol (7:3, by volume) was added thereto and reacted at 80° C. for 210 min. with stirring to give sodium dithionite in 1.0% yield.

When sodium hydroxide and the naphthohydroquinone were reacted first and then sulfur dioxide was added and reacted at an elevated temperature to produce sodium dithionite in 0.9% yield.

EXAMPLE 23

In a reactor similar to that in Example 1 was placed fine powders of sodium bisulfite (2.6 g., 25 mm.) and in a nitrogen atmosphere 80 ml. of a solution of 15 mm. of t-AmAHQ in a mixture solvent of mesitylene and DIBC (55:45, by volume) was added and reacted at 82° C. for 6 hours with stirring to produce sodium dithionite in 10.0% yield.

EXAMPLE 24

In a reactor similar to that in Example 1 was placed 6.5 ml. of a solution of 1.04 g. (25.9 mm.) of sodium hydroxide in methanol, and 16 ml. of a solution of 1.59 g. (24.8 mm.) of sulfur dioxide in methanol was added and reacted at room temperature. Then in a nitrogen atmosphere 100 ml. of a solution of 28 mm. of 2-amyl-9,10-anthrahydroquinone (a mixture of 40 mole% 2-t-amylanthrahydroquinone and 60 mole% 2-iso-sec.-amylanthrahydroquinone) in a mixture solvent of mesitylene and DIBC (55:45, by volume) was added and reacted at room temperature for 30 min. with stirring to produce sodium dithionite in 27% yield.

When sodium hydroxide and the amylanthrahydroquinone were first reacted and then sulfur dioxide was added and reacted at an elevated temperature, sodium dithionite was obtained in 25% yield.

EXAMPLE 25

In a reactor similar to that in Example 1 was placed 18 ml. of a solution of 1.16 g. (28.9 mm.) of sodium hydroxide in ethanol and then 9 ml. of a solution of 1.73 g. (27 mm.) of sulfur dioxide in xylene was added and reacted at room temperature. Then in a nitrogen atmosphere 120 ml. of a solution of 15 mm. of 9,10-phenanthrahydroquinone in a mixture solvent of mesitylene and DIBC (55:45, by volume) was added thereto and reacted at 86° C. for 10 min. with stirring to produce sodium dithionite in 0.4% yield.

When sodium hydroxide and the phenanthrahydroquinone were reacted first and then sulfur dioxide was added and reacted at an elevated temperature, sodium dithionite was obtained in 0.3% yield.

EXAMPLES 26–30

Various alkalis were reacted with sulfur dioxide at room temperature (for 2–3 hours in cases of MgO and ZnO), and then Et-AHQ was added and reacted with stirring in a nitrogen atmosphere. The results are shown in Table 1.

When the alkalis were firstly reacted with Et-AHQ and then sulfur dioxide was added and reacted at an elevated temperature, the results were almost similar to those as mentioned above.

Table 1

| Examples | Alkali (mm.) | Solvent (ml. of the solution) | SO$_2$ (mm.) | Solvent for SO$_2$ (ml. of the solution) | Et - AHQ (mm.) | Solvent for Et - AHQ* (ml. of the solution) | Reaction temperature (°C.) | Reaction time (min.) | Yield of sodium dithionite (%) |
|---|---|---|---|---|---|---|---|---|---|
| 26 | LiOH (20) | CH$_3$OH (10.4) | 20 | C$_2$H$_5$OH (6.4) | 10 | 50 | 60 | 10 | 59 |
| 27 | KOH (40) | CH$_3$OH (38) | 40 | xylene (11) | 18 | 90 | 74 | 30 | 4 |
| 28 | NH$_3$ (40) | C$_2$H$_5$OH (25.8) | 40 | xylene (11) | 20 | 100 | 50 | 7 | 31 |
| 29 | MgO (10) | C$_2$H$_5$OH (20) | 20 | C$_2$H$_5$OH (6.4) | 10 | 50 | 82 | 45 | 24 |
| 30 | ZnO (10) | C$_2$H$_5$OH (30) | 20 | C$_2$H$_5$OH (6.4) | 10 | 50 | 82 | 20 | 22 |

*A mixture solvent of DIBC and mesitylene (3:2, by volume) was used.

EXAMPLES 31-34

Various hydroquinones, sodium hydroxide or alcoholates, and sulfur dioxide were reacted following the procedures of Example 9. The reaction conditions and results are shown in Table 2.

When the alkalis and the hydroquinones were reacted first and then sulfur dioxide was added and reacted at an elevated temperature, the results were almost similar to those as mentioned above.

EXAMPLE 35

In a reactor similar to that in Example 1 was placed 4.8 g. (50 mm.) of sodium t-butoxide in 50 ml. of t-butanol and stirred, and then 3.2 g. (50 mm.) of sulfur dioxide in 40 ml. of xylene was added and reacted at room temperature, and further, in a nitrogen atmosphere 50 mm. of t-AmAHQ, 70 ml. of xylene and 30 ml. of t-butanol were added and reacted at 0° C. for 80 minutes with stirring to give sodium dithionite in 54.4% based on sulfur dioxide.

EXAMPLES 36-49

Various alkalis, t-AmAHQ and sulfur dioxide were reacted following the procedures of Example 9. The reaction conditions and results were shown in Table 3.

When the alkalis and t-AmAHQ were mixed firstly and then sulfur dioxide was added and reacted at an elevated temperature, the results were almost similar to those as mentioned above.

Table 2

| Example No. | Hydroquinone Compound | Amount (mm.) | Solvent for hydroquinone Solvent | Volume (ml.) | Alkali Compound | Amount (mm.) | Alkali solution Solvent | Volume of Solution (ml.) |
|---|---|---|---|---|---|---|---|---|
| 31 | 9,10-Anthra-hydroquinone | 10 | Xylene Ethanol | 200 50 | NaOH | 20 | Ethanol | 7 |
| 32 | 2-Ethoxy-9,10-Anthra-hydroquinone | 10 | Mesity-lene DIBC | 60 40 | NaOH | 20 | Ethanol | 7 |
| 33 | 2-Amyloxy-carbonyl-9,10-Anthra-hydroquinone | 15 | Xylene Ethanol | 70 30 | NaOCH$_3$ | 20 | Methanol | 30 |
| 34 | 5,6,7,8-Tetra-hydro-2-amyl-9,10-Anthra-hydroquinone | 50 | Xylene t-Butanol | 70 30 | NaO-t-Bu | 60 | t-Butanol | 40 |

| Example No. | SO$_2$ (mm.) | Xylene (ml. of the solution) | Reaction temp. (°C.) | Reaction time (min.) | Yield of dithionite (% based on SO$_2$) |
|---|---|---|---|---|---|
| 31 | 20 | 5.5 | 80 | 30 | 25 |
| 32 | 20 | 5.5 | 80 | 30 | 55 |
| 33 | 15 | 30 | 40 | 30 | 18 |
| 34 | 60 | 30 | 35 | 30 | 2 |

Table 3

| Example No. | Hydro-quinone (mm.) | Solvent for hydroquinone Solvent | Volume (ml.) | Alkali Compound | Amount (mm.) | Alkali solution Solvent | Volume of solution (ml.) |
|---|---|---|---|---|---|---|---|
| 36 | 20 | Mesithy-lene DIBC | 30 20 | Na$_2$O | 20 | Methanol | 12 |
| 37 | " | Mesithy-lene DIBC | 30 20 | Na$_2$S | 20 | Methanol | " |

Table 3-continued

| | | | | | | | |
|---|---|---|---|---|---|---|---|
| 38 | " | Mesitylene | 30 | $NaHCO_3$ | 40 | Methanol | " |
| | | DIBC | 20 | | | | |
| 39 | " | Mesitylene | 30 | $Na_2SO_3$ | 20 | Methanol | " |
| | | DIBC | 20 | | | | |
| 40 | " | Mesitylene | 30 | $Na_2HPO_4$ | 25 | Methanol | " |
| | | DIBC | 20 | | | | |
| 41 | " | Mesitylene | 30 | $CH_3COONa$ | 50 | Methanol | 20 |
| | | DIBC | 20 | | | | |
| 42 | " | Mesitylene | 30 | $Mg(OCH_3)_2$ | 25 | Methanol | " |
| | | DIBC | 20 | | | | |
| 43 | " | Mesitylene | 30 | $MgSO_3$ | " | Methanol | " |
| | | DIBC | 20 | | | | |
| 44 | " | Mesitylene | 30 | $CaSO_3$ | " | Methanol | " |
| | | DIBC | 20 | | | | |
| 45 | " | Mesitylene | 30 | $CaCO_3$ | 20 | Methanol | " |
| | | DIBC | 20 | | | | |
| 46 | " | Mesitylene | 30 | $Zn(OCH_3)_2$ | 25 | Methanol | " |
| | | DIBC | 20 | | | | |
| 47 | " | Mesitylene | 30 | $ZnSO_3$ | " | Methanol | " |
| | | DIBC | 20 | | | | |
| 48 | " | Mesitylene | 30 | $(NH_4)_2CO_3$ | " | Methanol | " |
| | | DIBC | 20 | | | | |
| 49 | " | Mesitylene | 30 | $(NH_4)_2SO_3 \cdot H_2O$ | " | Methanol | " |
| | | DIBC | 20 | | | | |

| Example No. | $SO_2$ (mm.) | Solvent | Volume of solution (ml.) | Reaction temp. (°C.) | Reaction time (min.) | Yield of dithionite (% based on $SO_2$) |
|---|---|---|---|---|---|---|
| 36 | 40 | Xylene | 11 | 71 | 30 | 66 |
| 37 | " | " | " | " | 10 | 33 |
| 38 | " | Methanol | 10 | " | 30 | 54.2 |
| 39 | " | Methanol | " | " | " | 46.3 |
| 40 | " | Methanol | " | 60 | 15 | 5.2 |
| 41 | " | Methanol | " | " | " | 14.8 |
| 42 | " | Methanol | " | 70 | 30 | 42.0 |
| 43 | 25 | Methanol | 8 | 70 | 60 | 10.7 |
| 44 | " | Methanol | " | " | 120 | 4.4 |
| 45 | 50 | Methanol | 10 | " | " | 2.0 |
| 46 | " | Methanol | " | " | 30 | 34.1 |
| 47 | 25 | Methanol | 8 | " | 120 | 4.2 |
| 48 | 50 | Methanol | 10 | " | 10 | 31.1 |
| 49 | 25 | Methanol | " | " | " | 25.2 |

EXAMPLES 50-60

To 16.6 g. (132 mm.) of sodium sulfite was added 100 ml. of methanol, and then a solution of sulfur dioxide (8.3 g., 130 mm.) in methanol with stirring at room temperature. After stirring for one hour, the reaction mixture was allowed to stand still and after 24 hours, the supernatant portion was removed and thereby, a methanol suspension containing 0.89 moles/l. of sodium pyrosulfite was obtained.

Then, to each of solutions of alkyl substituted anthrahydroquinones in a mixture solvent of mesitylene and DIBC (55:45, by volume) was added 4.9 ml. of the abovementioned methanol suspension of sodium pyrosulfite (containing 3.2 mm. of sodium pyrosulfite) and the reactions were carried out under the conditions as shown in Table 4. Yield of the resulting sodium dithionite is shown in the right and column of Table 4.

Table 4

| Example No. | Hydroquinones | Amount of hydroquinone (mm.) | A solution of hydroquinone in mesitylene-DIBC mixture (ml.) | Reaction temperature (°C.) | Reaction time (min.) | Yield of sodium dithionite (% based on sodium pyrosulfite) |
|---|---|---|---|---|---|---|
| 50 | 2-Butylanthrahydroquinone | 6.4 | 32 | 90 | 10 | 78 |
| 51 | 2-Amyl,6(or 7)-methyl-anthrahydroquinone | 0.64 | 1.6 | 60 | 30 | 14 |
| 52 | 2-Amyl,6(or 7)-methyl-anthrahydroquinone | 9.6 | 24 | 90 | 10 | 85 |
| 53 | 2-Amyl,6(or 7)-methyl-anthrahydroquinone | 32 | 80 | 90 | 5 | 88 |
| 54 | 2-Amyl,6(or 7)-methyl-anthrahydroquinone | 9.6 | 24 | 110 | 0.5 | 84 |
| 55 | 2-Amyl,6(or 7)-butyl-anthrahydroquinone | 9.6 | 16 | 40 | 30 | 80 |
| 56 | 2-,6(or 7)-Diamylanthra-hydroquinone | 6.4 | 16 | 90 | 10 | 82 |
| 57 | 2-,6(or 7)-Dibutylanthra-hydroquinone | 6.4 | 16 | 90 | 10 | 81 |
| 58 | 2-Butyl,6(or 7)-methyl-anthrahydroquinone | 9.6 | 30 | 40 | 30 | 75 |
| 59 | 2-Butyl,6(or 7)-ethyl-anthrahydroquinone | 9.6 | 30 | 40 | 30 | 76 |
| 60 | 1,3-Dimethyl,6-butyl-anthrahydroquinone | 6.4 | 16 | 60 | 30 | 80 |

EXAMPLE 61

(1) One liter of a solution of 2-t-amylanthraquinone (111 g., 0.4 moles) in a mixture solvent of DIBC and mesitylene (45:55, by volume) and 50 g. of a palladium catalyst (1% by weight of palladium carried on alumina-magnesia) were placed in a 2 l. four-necked flask and the flask was swept with hydrogen, and then the mixture was strongly stirred at 30° C. for 15 min. to reduce the quinone to produce the corresponding hydroquinone. The amount of hydrogen reacted with the quinone was 0.32 moles and this indicates that 80 mole % of the amylanthraquinone was converted to the hydroquinone. Then, the solution was filtered with a glass filter to remove the palladium catalyst. The resulting solution is referred to as "Solution-A" hereinafter.

(2) 184 g. of sodium sulfite (purity: 92%) and 169 g. of methanol were placed in a 1 l. four-necked flask, and 312 g. of a 27.6% (by weight) solution of sulfur dioxide in methanol was slowly added dropwise with stirring. Then, the mixture was stirred at 30° C. for 3 hours. The resulting solution is referred to as "Solution-B".

(3) Solution-A was placed in a 2 l. four-necked flask, heated to 80° C. and Solution-B (56 g.) was added thereto. After stirring for 15 min., the mixture was cooled to 25° C., and then 250 g. of water was added, stirred for 3 min. and stood still. Then the upper layer (organic phase) and the lower layer (aqueous phase) were separated.

(4) The lower layer was washed with 50 ml. of mesitylene and the mesitylene layer was separated and removed, and then 460 g. of methanol was gradually added to the aqueous solution, and allowed to stand at room temperature for one hour. The resulting crystals were filtered and dried by heating at 60° C. for 7 hours to give 12.5 g. (purity: 93.5%) of sodium dithionite.

(5) The upper layer in (3) above was washed with 250 g. and then 500 g. of water and the aqueous layer was removed. The remaining organic layer was placed in the four-necked flask as in (1) above and hydrogenated in the same manner as in (1) above (0.09 moles of hydrogen was reacted). After filtering with a glass filter, the resulting solution was reacted with Solution-B in a way similar to that in (3) above followed by a procedure similar to (4) above to produce 12.8 g. (purity: 92.1%) of crystals of sodium dithionate.

What we claim is:

1. A process for preparing a dithionite, which process comprises reacting
   (A) a member selected from the group consisting of
      (1) and (2), these being
      (1) bisulfite, pyrosulfite, alkylsulfite, and arylsulfite salts of elements of Groups Ia, IIa and IIb of the Periodic Table, and ammonium, and
      (2) a combination of
         (i) substances capable of producing the salts as mentioned in 1) above by reaction with sulfur dioxide or sulfurous acid, and
         (ii) sulfur dioxide or sulfurous acid, with
   (B) a hydroquinone.

2. A process according to claim 1 in which (B), the hydroquinone, is reacted with a substance from (A), (2) (i) and sulfur dioxide or sulfurous acid.

3. A process according to claim 1 in which sulfur dioxide or sulfurous acid is reacted with a substance from (A) (2) (i) and the resulting product is reacted with (B), the hydroquinone.

4. A process according to claim 1 in which (B), the hydroquinone, is mixed with sulfur dioxide or sulfurous acid and the resulting mixture is intimately contacted with a substance from (A) (2) (i).

5. A process according to claim 1 in which (A) (2) (i) is mixed and reacted with (B), the hydroquinone, and then the resulting product is reacted with sulfur dioxide or sulfurous acid.

6. A process according to claim 1 in which the salt of (A) (1) is a Group Ia or ammonium bisulfite, pyrosulfite, alkylsulfite or arylsulfite.

7. A process according to claim 1 in which the salt of (A) (1) is a bisulfite or a pyrosulfite of said elements and ammonium.

8. A process according to claim 1 in which the substance of (A) (2) (i) is a compound of an element of Group Ia or ammonium.

9. A process according to claim 1 in which the substance of (A) (2) (i) is selected from hydroxides, oxides, amides, carbonates, bicarbonates, phosphates, hydrogenphosphates, borates, hydrogenphosphates, alcoholates, phenolates and organic acid salts.

10. A process according to claim 1 in which the substance of (A) (2) (i) is selected from hydroxides, sulfites, and carbonates.

11. A process according to claim 1 in which the element of Group Ia is selected from lithium, sodium and potassium.

12. A process according to claim 1 in which the element of Group IIa is magnesium or calcium.

13. A process according to claim 1 in which the element of Group IIb is zinc.

14. A process according to claim 1 in which the alkylsulfite has an alkyl containing 1–5 carbon atoms.

15. A process according to claim 1 in which the arylsulfite is a phenylsulfite or a tolylsulfite.

16. A process according to claim 1 in which the hydroquinone is selected from benzohydroquinone, naphthohydroquinone, anthrahydroquinone, phenanthrahydroquinone and derivatives thereof responding to the formula $H_2Q$ where Q represents the quinone part of the hydroquinone.

17. A process according to claim 16 in which the derivatives have at least one substituent selected from —R, —X, —OH, —OR, —SH, —$NH_2$, —NHR, —$NR_2$, —COOH, —$SO_3H$, —COOR, —$CONH_2$ and CHO, where R is alkyl and X is halogen.

18. A process according to claim 16 in which the derivatives have at least one substituent selected from —R, —X, —OH, —OR, —SH, —$NH_2$, —NHR, and —$NR_2$ where R is alkyl and X is halogen.

19. A process according to claim 16 in which the derivatives have at least one alkyl group.

20. A process according to claim 19 in which the alkyl contains 1–5 carbon atoms.

21. A process according to claim 1 in which the hydroquinone is a mono-, di-, or tri-alkyl substituted 9,10-anthrahydroquinone.

22. A process according to claim 21 in which the alkyl contains 1–5 carbon atoms.

23. A process according to claim 21 in which the hydroquinone is selected from ethylanthrahydroquinone, amylanthrahydroquinone, butyl-anthrahydroquinone, dibutylanthrahydroquinone, methyl-amyl-anthrahydroquinone, ethylamyl-anthrahydroquinone, diamyl-anthrahydroquinone, butylamyl-anthrahydroquinone, methyl-butyl-anthrahydroquinone, ethyl-butyl-anthrahydroquinone, and dimethyl-butyl-anthrahydroquinone.

24. A process according to claim 21 in which the hydroquinone is 2-amyl-9,10-anthrahydroquinone.

25. A process according to claim 21 in which the hydroquinone is selected from 2-t-amyl-9,10-anthrahydroquinone, 2-sec-amyl-9,10-anthrahydroquinone and a mixture thereof.

26. A process according to claim 1 in which the molar ratio of the salt of (A) (1) or a substance of (A) (2) (i) to the hydroquinone is not more than 10.

27. A process according to claim 1 in which the molar ratio of the salt of (A) (1) or a substance of (A) (2) (i) to the hydroquinone is not more than 4.

28. A process according to claim 1 in which the molar ratio of the salt of (A) (1) or a substance of (A) (2) (i) to the hydroquinone is 0.1–4.

29. A process according to claim 1 in which the substance of (A) (2) (i) is selected from compounds of elements of Group Ia, and ammonia, and the molar ratio of the substance of (A) (2) (i) to the compound of (A) (2) (ii) of 0.1–10.

30. A process according to claim 29 in which the molar ratio is 0.5–2.

31. A process according to claim 1 in which the substance of (A) (2) (i) is selected from compounds of elements of Group IIa and compounds of elements of Group IIb, and the molar ratio of the substance of (A) (2) (i) to the compounds of (A) (2) (ii) is 0.05–5.

32. A process according to claim 31 in which the ratio is 0.25–1.

33. A process according to claim 1 in which the amount of the compound of (A) (2) (ii) is not more than 10 moles per one mole of the hydroquinone.

34. A process according to claim 1 in which the amount of the compound of (A) (2) (ii) is not more than 5 moles per one mole of the hydroquinone.

35. A process according to claim 1 in which the amount of the compound of (A) (2) (ii) is 0.1–5 moles per one mole of the hydroquinone.

36. A process according to claim 1 in which a solvent is used which can dissolve the hydroquinone or both the hydroquinone and a quinone produced by oxidation of the hydroquinone during the reaction.

37. A process according to claim 36 in which the solvent is a member selected from aromatic hydrocarbons, ethers, organic acid esters, alcohols, amides, and inorganic acid esters and mixtures thereof.

38. A process according to claim 37 in which the solvent is selected from alcohols, phosphoric acid esters, mixtures of an alcohol and the other solvent(s) and mixtures of a phosphoric acid ester and the other solvent(s).

39. A process according to claim 38 in which the solvent is a mixture of an alcohol and an aromatic hydrocarbon.

40. A process according to claim 39 in which the alcohol is diisobutyl carbinol or butanol.

41. A process according to claim 39 in which the aromatic hydrocarbon is mesitylene or xylene.

42. A process according to claim 1 in which one or more inert solvents are used and the solvent or total of the solvents contain not more than 20% by volume of water.

43. A process according to claim 1 in which a temperature of from −20° to 150° C. is employed during the reaction.

44. A process according to claim 43 in which the reaction temperature is from 20° to 120° C.

45. A process which comprises reacting an alkyl-substituted 9,10-anthrahydroquinone with a member selected from the group of sodium bisulfite and sodium pyrosulfite to produce sodium dithionite.

46. A process which comprises reacting an alkyl-substituted 9,10-anthrahydroquinone with a member selected from the group consisting of sodium hydroxide and sodium carbonate, and a member selected from the group consisting of sulfur dioxide and sulfurous acid to produce sodium dithionite.

47. A process according to claim 1 in which a quinone produced in the reaction is hydrogenated to convert it to the hydroquinone and wherein the hydroquinone so formed is again reacted with (A).

* * * * *

UNITED STATES PATENT AND TRADEMARK OFFICE
CERTIFICATE OF CORRECTION

PATENT NO. : 4,177,247
DATED : December 4, 1979
INVENTOR(S) : EIICHI YONEMITSU ET AL It is certified that error appears in the above-identified patent and that said Letters Patent are hereby corrected as shown below:

Abstract, lines 2-3, cancel "or" after "alkyl sulfites", and insert --or-- after "aryl sulfites".

Column 3, line 24, change "of" (second instance) to --or--.

Column 7, line 19, correct the spelling of "atmosphere".

Column 9, line 32, correct the spelling of "atmosphere".

Column 18, line 3, change "of" to --is--.

Signed and Sealed this

Twenty-sixth Day of August 1980

[SEAL]

Attest:

Attesting Officer

SIDNEY A. DIAMOND

Commissioner of Patents and Trademarks